United States Patent
Takashima et al.

(10) Patent No.: US 12,088,217 B2
(45) Date of Patent: Sep. 10, 2024

(54) POWER CONVERSION DEVICE, TRANSPORT SYSTEM, POWER CONVERSION METHOD, NON-TRANSITORY COMPUTER-READABLE STORAGE MEDIUM WITH A PROGRAM STORED THEREON, AND DIAGNOSIS DEVICE

(71) Applicant: KABUSHIKI KAISHA YASKAWA DENKI, Fukuoka (JP)

(72) Inventors: Yuta Takashima, Fukuoka (JP); Ryohei Hashimoto, Fukuoka (JP); Masatoshi Fujikawa, Fukuoka (JP)

(73) Assignee: KABUSHIKI KAISHA YASKAWA DENKI, Fukuoka (JP)

(*) Notice: Subject to any disclaimer, the term of this patent is extended or adjusted under 35 U.S.C. 154(b) by 86 days.

(21) Appl. No.: 17/806,013

(22) Filed: Jun. 8, 2022

(65) Prior Publication Data
US 2022/0302854 A1    Sep. 22, 2022

Related U.S. Application Data

(63) Continuation of application No. PCT/JP2020/043260, filed on Nov. 19, 2020.

(30) Foreign Application Priority Data

Dec. 13, 2019  (JP) ................. 2019-225771

(51) Int. Cl.
*H02M 7/5395* (2006.01)
*B65G 23/22* (2006.01)
*H02P 27/08* (2006.01)

(52) U.S. Cl.
CPC .......... *H02M 7/5395* (2013.01); *B65G 23/22* (2013.01); *H02P 27/08* (2013.01)

(58) Field of Classification Search
CPC .... H02P 27/047; H02P 29/028; H02P 29/032; H02P 29/40; H02P 29/024; H02P 27/00;
(Continued)

(56) References Cited

U.S. PATENT DOCUMENTS

| 2004/0052097 A1 | 3/2004 | Morimoto |
| 2004/0195992 A1 | 10/2004 | Shimizu et al. |
| 2006/0113953 A1 | 6/2006 | Shimizu et al. |

FOREIGN PATENT DOCUMENTS

| EP | 1 306 967 A1 | 5/2003 |
| EP | 1 460 709 A1 | 9/2004 |

(Continued)

OTHER PUBLICATIONS

Asai Takashi et al., INVERTER, Aug. 26, 2004, Clarivate Analytics, pp. 1-21. (Year: 2004).*

(Continued)

*Primary Examiner* — Antony M Paul
(74) *Attorney, Agent, or Firm* — Osha Bergman Watanabe & Burton LLP

(57) ABSTRACT

Provided is a power conversion device including a power conversion circuit that converts primary power to secondary power and supplies the secondary power to a motor, and a control circuit that causes, by the power conversion circuit, a secondary power quantity to follow a control command. The control circuit calculates a fluctuation level representing a fluctuation range of driving force of the motor within a sampling period having a predetermined length, and detects, based on the fluctuation level, an abnormality of a transport device including the motor and a transport unit driven by the motor.

18 Claims, 9 Drawing Sheets

(58) Field of Classification Search
CPC .......... H02P 27/04; H02P 27/06; H02P 21/00; H02P 21/14; H02P 21/20; H02P 21/22; H02P 23/07; H02P 23/28; H02P 1/24; H02P 1/42; H02P 1/46; H02P 6/28; H02P 6/08; B65G 23/22; B65G 43/02; G06F 11/3006; H02M 1/32
See application file for complete search history.

(56) References Cited

FOREIGN PATENT DOCUMENTS

| | | | |
|---|---|---|---|
| EP | 2 913 919 A1 | 9/2015 | |
| JP | 2002-34289 A | 1/2002 | |
| JP | 2002-126910 A | 5/2002 | |
| JP | 2004242480 A * | 8/2004 | ............... H02P 7/63 |
| JP | 2004-266994 A | 9/2004 | |
| JP | 2006-158031 A | 6/2006 | |
| JP | 2007-070066 A | 3/2007 | |
| JP | 2017-192990 A | 10/2017 | |
| JP | 2019-71755 A | 5/2019 | |

OTHER PUBLICATIONS

Office Action dated Apr. 25, 2023 for Corresponding Japanese Application No. 2021-563826.
EESR issued on November 8, 2023_EP Application No. 20899314.7.

* cited by examiner

POWER CONVERSION DEVICE, TRANSPORT SYSTEM, POWER CONVERSION METHOD, NON-TRANSITORY COMPUTER-READABLE STORAGE MEDIUM WITH A PROGRAM STORED THEREON, AND DIAGNOSIS DEVICE

CROSS-REFERENCE TO RELATED APPLICATIONS

This application is the U.S. national stage application filed pursuant to 35 U.S.C. 365(c) and 120 as a continuation of International Patent Application No. PCT/JP2020/043260, filed Nov. 19, 2020, which application claims priority to Japanese Patent Application No. 2019-225771, filed Dec. 13, 2019, which applications are incorporated herein by reference in their entireties.

TECHNICAL FIELD

The present disclosure relates to a power conversion device, a transport system, a power conversion method, a non-transitory computer-readable storage medium with a program stored thereon, and a diagnosis device.

BACKGROUND ART

Patent Document 1 describes a transport device to which an inverter is applied.

CITATION LIST

Patent Literature; Patent Document 1: JP 2007-70066 A.

SUMMARY OF INVENTION

Technical Problem

The present disclosure provides a power conversion device, a transport system, a power conversion method, a non-transitory computer-readable storage medium with a program stored thereon, and a diagnosis device effective in simplifying a configuration for detecting an abnormality of equipment.

Solution to Problem

A power conversion device according to an aspect of the present disclosure includes a power conversion circuit configured to convert primary power to secondary power and supply the secondary power to a motor, and a control circuit configured to cause, by the power conversion circuit, a secondary power quantity to follow a control command, and the control circuit calculates a fluctuation level representing a fluctuation range of driving force of the motor within a sampling period having a predetermined length and detects, based on the fluctuation level, an abnormality of equipment including the motor and a movable unit driven by the motor.

A transport system according to another aspect of the present disclosure includes the power conversion device and the equipment described above, and the equipment includes, as the movable unit, a transport unit configured to support and transport an object, and as the motor, a motor configured to drive the transport unit.

A power conversion method according to still another aspect of the present disclosure includes causing, by a power conversion circuit configured to convert primary power to secondary power and supply the secondary power to a motor, a secondary power quantity to follow a control command, calculating a fluctuation level representing a fluctuation range of driving force of the motor within a sampling period having a predetermined length, and detecting, based on the fluctuation level, an abnormality of equipment including the motor and a movable unit driven by the motor.

A non-transitory computer-readable storage medium with a program stored thereon according to still another aspect of the present disclosure is a non-transitory computer-readable storage medium with a program stored thereon for causing a power conversion device to execute causing, by a power conversion circuit configured to convert primary power to secondary power and supply the secondary power to a motor, a secondary power quantity to follow a control command, calculating a fluctuation level representing a fluctuation range of driving force of the motor within a sampling period having a predetermined length, and detecting, based on the fluctuation level, an abnormality of equipment including the motor and a movable unit driven by the motor.

A diagnosis device according to still another aspect of the present disclosure is configured to calculate, based on power supplied from a power conversion circuit to a motor, a fluctuation level representing a fluctuation range of driving force of the motor in a sampling period having a predetermined length, and detect, based on the fluctuation level, an abnormality of equipment including the motor and a movable unit.

Advantageous Effects of Invention

According to the present disclosure, it is possible to provide a power conversion device, a transport system, a power conversion method, a non-transitory computer-readable storage medium with a program stored thereon, and a diagnosis device effective in simplifying a configuration for detecting an abnormality of equipment.

BRIEF DESCRIPTION OF DRAWINGS

Various embodiments are disclosed, by way of example only, as follows.

DESCRIPTION OF EMBODIMENTS

Embodiments will be described in detail below with reference to drawings. In the description, elements which are the same or have the same function are given the same reference numbers, and redundant descriptions are omitted.

Transport System

Figure 1:
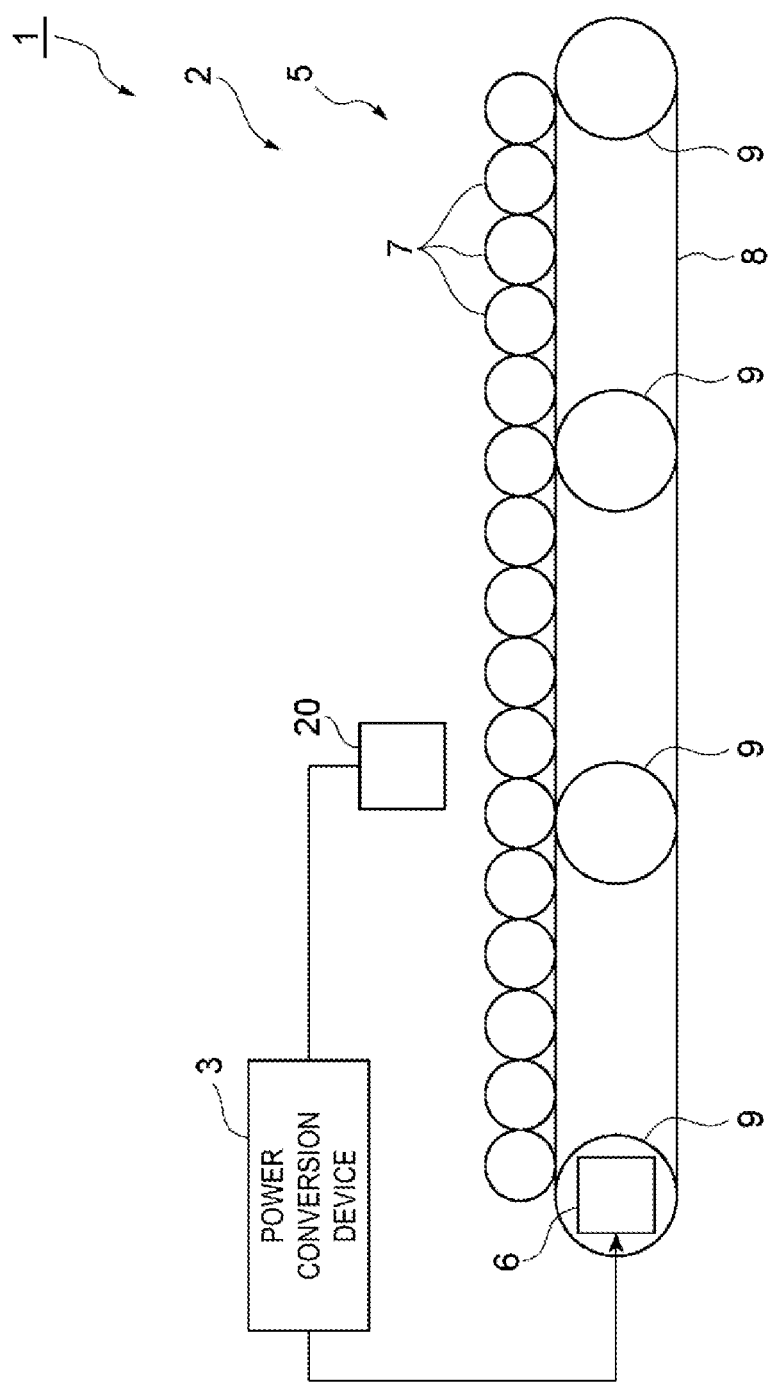
FIG. 1 is a schematic view illustrating an example of a configuration of a transport system.
Figure 2:
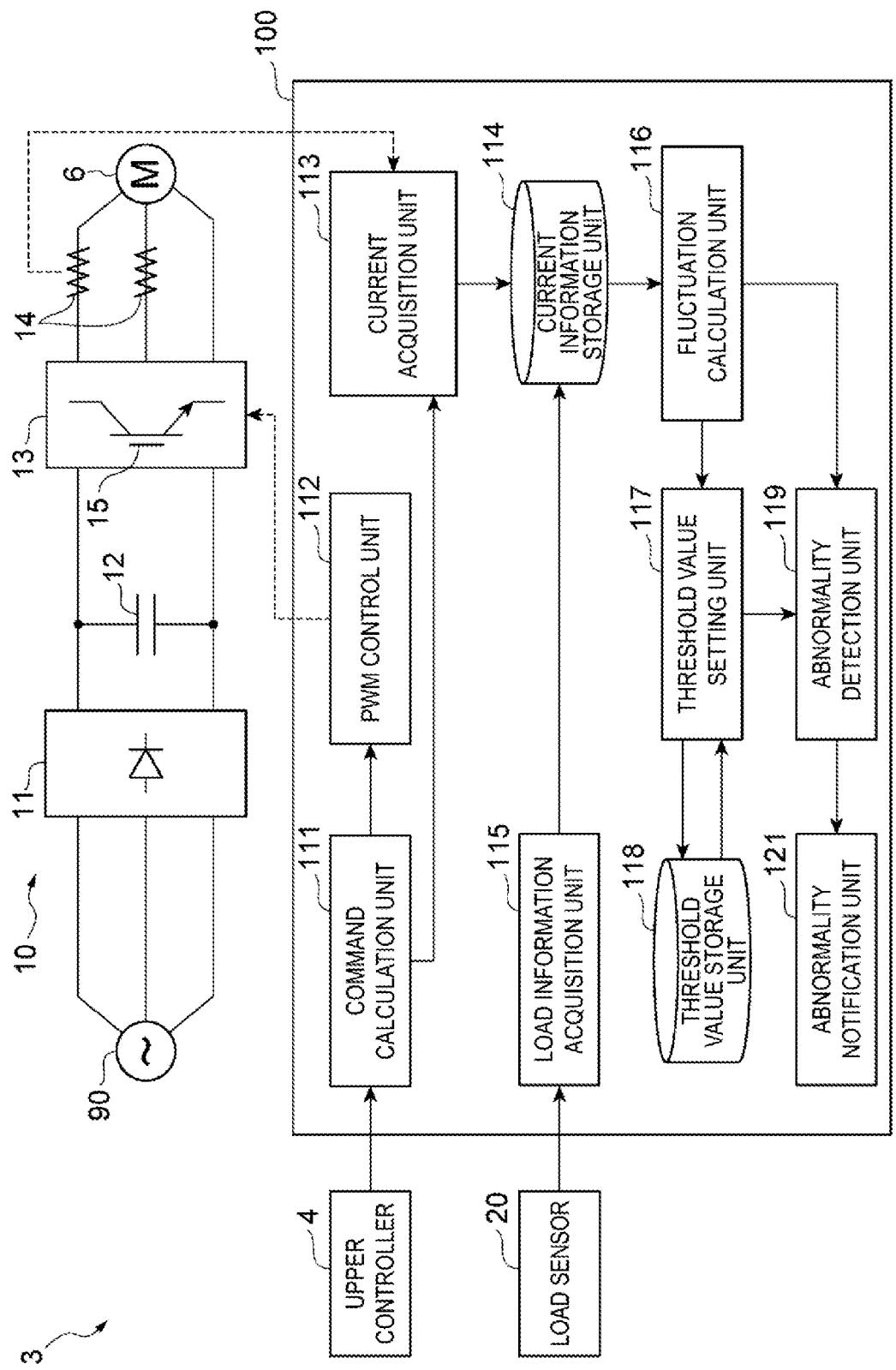
FIG. 2 is a block diagram illustrating a functional configuration of a power conversion device.

The transport system 1 illustrated in FIG. 1 is a system for transporting an object, and includes a transport device 2, a power conversion device 3, and an upper controller 4 (see FIG. 2). Specific examples of the transport device 2 include a belt conveyor and a roller conveyor.

The transport device 2 illustrated in FIG. 1 is a roller conveyor and includes a transport unit 5 and a motor 6. The transport unit 5 (movable unit) includes a plurality of transport rollers 7, a belt 8, a plurality of pulleys 9, and a load sensor 20. The plurality of transport rollers 7 are arranged in a transport direction of the object, perpendicular to the transport direction. The plurality of transport rollers 7 rotate in the same direction while supporting the object, to transport the object along the transport direction. The belt 8 is looped over the plurality of pulleys 9, and is in contact with the plurality of transport rollers 7.

The motor 6 drives the transport unit 5. For example, the motor 6 is a rotary electric motor and rotates at least one of the pulleys 9. The torque from the motor 6 rotating the pulley 9 is transmitted to the plurality of transport rollers 7 via the belt 8. As a result, the plurality of transport rollers 7 rotate in the same direction. The motor 6 may be an induction electric motor or a synchronous electric motor.

The load sensor 20 detects a load on the transport device 2 (e.g., the weight of the object to be transported). The load sensor 20 may be a load presence sensor that detects whether an object to be transported exists.

As illustrated in FIG. 2, the power conversion device 3 converts power (primary power) of a power source 90 into driving power (secondary power) and supplies the driving power to the motor 6. The power from the power source 90 may be alternating current power or direct current power. The driving power is alternating current power. In an example, the power from the power source 90 and the driving power are both three-phase alternating current power. For example, the power conversion device 3 includes a power conversion circuit 10 and a control circuit 100.

The power conversion circuit 10 converts the primary power into the secondary power and supplies the secondary power to the motor 6. For example, the power conversion circuit 10 includes a converter circuit 11, a smoothing capacitor 12, an inverter circuit 13, and a current sensor 14. The converter circuit 11 is, for example, a diode bridge circuit or a PWM converter circuit, and converts the source power described above to direct current power. The smoothing capacitor 12 smooths the direct current power described above. The inverter circuit 13 performs power conversion between the direct current power described above and the driving power described above.

For example, the inverter circuit 13 includes a plurality of switching elements 15, and performs the power conversion described above by switching the plurality of switching elements 15 on and off. Each of the switching elements 15 is, for example, a power metal oxide semiconductor field effect transistor (MOSFET) or an insulated gate bipolar transistor (IGBT), and is switched on and off in accordance with a gate drive signal.

The current sensor 14 detects a current flowing between the inverter circuit 13 and the motor 6. For example, the current sensor 14 may be configured to detect the currents of all phases of the three-phase alternating current (U phase, V phase, and W phase), or may be configured to detect the currents of any two phases of the three-phase alternating current. A sum of the currents of the U phase, V phase, and W phase is zero except in a case in which a zero phase current occurs, and thus the information of the currents of all phases can be acquired even in a case in which the currents of two phases are detected.

The configuration of the power conversion circuit 10 described above is merely an example. The configuration of the power conversion circuit 10 can be modified in any manner as long as the driving power of the motor 6 can be generated. The power conversion circuit 10 may be a matrix converter circuit that performs bidirectional power conversion between the source power and the driving power without direct current conversion. In a case in which the source power is direct current power, the power conversion circuit 10 need not include the converter circuit 11.

The control circuit 100 controls the power conversion circuit 10 such that a secondary power quantity follows a control command. The secondary power quantity is a physical quantity relating to an electrical state on the secondary side. Specific examples of the secondary power quantity include power, a voltage, and a current. The control circuit 100 calculates a fluctuation level representing a fluctuation range of the driving force of the motor 6 within a sampling period having a predetermined length and detects, based on the fluctuation level, an abnormality of the transport device 2 (equipment) including the motor 6 and the transport unit 5 (movable unit driven by the motor 6).

The abnormality of the transport device 2 may be an abnormality of the motor 6, or may be an abnormality of the transport unit 5. Specific examples of the abnormality of the motor 6 include damage to a bearing portion. Specific examples of the abnormality of the transport unit 5 include damage to a bearing portion of the transport roller 7, damage to a bearing portion of the pulley 9, damage to the belt 8, entry of a foreign matter between adjacent transport rollers 7, entry of a foreign matter between the transport roller 7 and the belt 8, and entry of a foreign matter between the belt 8 and the pulley 9.

The control circuit 100 may set a threshold value based on the fluctuation level when the transport device 2 is in an unloaded state (e.g., when there is no object to be transported), and after setting the threshold value, the control circuit 100 may calculate the fluctuation level when the transport device 2 is in an unloaded state and detect, based on the fluctuation level and the threshold value, an abnormality of the transport device 2.

The control circuit 100 may detect an abnormality of the transport device 2, based on the number of fluctuation levels above the threshold value included in a plurality of fluctuation levels obtained by repeatedly calculating the fluctuation level when the transport device 2 is in an unloaded state.

The control circuit 100 may acquire a plurality of evaluation result sets (hereinafter, referred to as "level sets") each including the fluctuation level and a load level representing a magnitude of a load on the transport device 2 (e.g., the weight of an object to be transported) and set, based on the plurality of evaluation result sets, a threshold value profile representing a relationship between the load level and a threshold value, and after setting the threshold value profile, the control circuit 100 may acquire one level set including the load level and the fluctuation level and detect, based on the one level set and the threshold value profile, an abnormality of the transport device 2.

The control circuit 100 may detect an abnormality of the transport device 2, based on the number of level sets above the threshold value profile included in a plurality of level sets obtained by repeatedly acquiring the one level set.

The control circuit 100 may calculate, as the control command and by a V/f method, a voltage command corresponding to a frequency command, and may calculate the fluctuation level, based on the frequency command and current flowing between the power conversion circuit 10 and the motor 6.

For example, as illustrated in FIG. 2, the control circuit 100 includes, as functional components (hereinafter, referred to as "functional blocks"), a command calculation unit 111, a PWM control unit 112, a current acquisition unit 113, a current information storage unit 114, a load information acquisition unit 115, a fluctuation calculation unit 116, a threshold value setting unit 117, a threshold value storage unit 118, an abnormality detection unit 119, and an abnormality notification unit 121.

The command calculation unit 111 calculates the control command. For example, the command calculation unit 111 calculates, as the control command and by the V/f method, the voltage command corresponding to the frequency command. The voltage command includes the magnitude of the voltage command (hereinafter, referred to as a "voltage command value") and a phase angle of the voltage command (hereinafter, referred to as a "voltage phase angle"). For example, the command calculation unit 111 calculates the voltage command value corresponding to the frequency command according to a predetermined command profile, and calculates the voltage phase angle, based on the frequency command. The command calculation unit 111 may calculate, as the control command, a voltage command vector having a component along one of orthogonal coordinate axes equal to the voltage command value and a component along the other of the orthogonal coordinate axes equal to zero, and the voltage phase angle. The voltage command vector calculated in this way may be further subjected to resistance voltage drop compensation and decoupling compensation and the result thus obtained may be used as the voltage command vector.

Note that the command calculation unit 111 may acquire the frequency command from the upper controller 4, or may internally hold a preset frequency command. The command calculation unit 111 may acquire the frequency command from an input device 102 (described below). Specific examples of the upper controller 4 include a programmable logic controller. The command calculation unit 111 repeatedly executes the calculation of the voltage command in predetermined control cycles.

The PWM control unit 112 controls the power conversion circuit 10 such that the secondary power quantity follows the control command calculated by the command calculation unit 111. For example, the PWM control unit 112 causes the voltage of the driving power to follow the voltage command. For example, the PWM control unit 112 switches on or off the plurality of switching elements 15 of the inverter circuit 13 such that a voltage according to the voltage command is output to the motor 6.

The current acquisition unit 113 acquires current information from the current sensor 14. For example, the current acquisition unit 113 calculates a current vector in a rotating coordinate system by performing three-phase to two-phase conversion and coordinate transformation on the current information acquired from the current sensor 14. In an example, the current acquisition unit 113 calculates a δ-axis current, which is a current component in a direction of a coordinate axis parallel to the voltage command vector described above or an induced voltage vector in the motor 6 (δ-axis), and a γ-axis current, which is a current component in a direction of a coordinate axis perpendicular to the δ-axis (γ-axis). Note that when the voltage command vector is determined by using the resistance voltage drop compensation and the decoupling compensation described above, the induced voltage vector is equal to the voltage command vector before being subjected to these compensations.

This coordinate transformation requires a phase of the rotating coordinate system with respect to the fixed coordinate system. For example, the current acquisition unit 113 uses, as the phase of the rotating coordinate system, the above-described voltage phase angle calculated by the command calculation unit 111. For example, the current acquisition unit 113 calculates the δ-axis current and the γ-axis current based on the current information acquired from the current sensor 14 and the above-described voltage phase angle. The current acquisition unit 113 repeatedly executes, in the above-described control cycles, acquiring the current information and calculating the δ-axis current and the γ-axis current.

The load information acquisition unit 115 acquires, from the load sensor 20, information related to the load (hereinafter, referred to as "load information"). For example, the load information acquisition unit 115 acquires, from the load sensor 20, information indicating whether the transport device 2 is in an unloaded state. The load information acquisition unit 115 may acquire the above-described load level from the load sensor 20. The load information acquisition unit 115 may acquire the load information from the upper controller 4. The current information storage unit 114 accumulates, in a chronological order, the δ-axis current and the γ-axis current calculated by the current acquisition unit 113, and the load information acquired by the load information acquisition unit 115 such that the δ-axis current and the γ-axis current are associated with the load information.

The fluctuation calculation unit 116 calculates the fluctuation level representing a fluctuation range of the driving force of the motor δ within the sampling period having the predetermined length. The length of the above-described sampling period is longer than the length of the control cycle. For example, the length of the above-described sampling period is 5 to 300000 times the length of the control cycle.

As an example, the fluctuation calculation unit 116 calculates the fluctuation level representing a fluctuation range of the δ-axis current within the sampling period. As described above, the δ-axis current is calculated based on the current information acquired from the current sensor 14 and the voltage phase angle calculated based on the above-described frequency command. Thus, calculating the fluctuation level representing the fluctuation range of the δ-axis current is an example of calculating the fluctuation level based on the current flowing between the power conversion circuit 10 and the motor 6 and the frequency command.

The above-described fluctuation level may be a difference between the maximum value and the minimum value of the δ-axis current within the sampling period, or may be a standard deviation of the δ-axis current within the sampling period. The fluctuation calculation unit 116 may repeat the calculation of the fluctuation level at intervals equal to the sampling period or longer than the sampling period.

The threshold value setting unit 117 sets a threshold value based on the fluctuation level when the transport device 2 is in an unloaded state. For example, the threshold value setting unit 117 calculates the threshold value by adding a predetermined margin to the fluctuation level when the transport device 2 is in an unloaded state. The threshold value setting unit 117 may calculate the threshold value by adding a predetermined margin to the average value of a plurality of fluctuation levels calculated when the transport device 2 is in an unloaded state. The threshold value setting unit 117 may calculate the threshold value based on the average value of a plurality of fluctuation levels calculated when the transport device 2 is in an unloaded state and the standard deviation of the plurality of fluctuation levels. In an example, the threshold value setting unit 117 may calculate the threshold value by adding, to the average value described above, a value obtained by multiplying the above-described standard deviation by a predetermined multiplying factor. The threshold value setting unit 117 may calculate, as the threshold value, the maximum value of Mahalanobis distance (MD) values of a plurality of fluctuation levels calculated when the transport device 2 is in an unloaded state. The MD value is a value obtained by multiplying a matrix of values obtained by subtracting the average value of the plurality of fluctuation levels from each of the plurality of fluctuation levels, a covariance matrix of the plurality of fluctuation levels, and an inverse matrix of the values obtained by subtracting the average value of the plurality of fluctuation levels from each of the plurality of fluctuation levels. The threshold value storage unit 118 holds the threshold value set by the threshold value setting unit 117.

The abnormality detection unit 119 detects an abnormality of the transport device 2, based on the fluctuation level. For example, after the threshold value setting unit 117 sets the threshold value, the abnormality detection unit 119 acquires the fluctuation level calculated by the fluctuation calculation unit 116 when the transport device 2 is in an unloaded state, and detects an abnormality of the transport device 2, based on the fluctuation level and the threshold value. For example, if the fluctuation level is above the threshold value, the abnormality detection unit 119 detects an abnormality of the transport device 2.

The abnormality detection unit 119 may detect an abnormality of the transport device 2, based on the number of fluctuation levels above the threshold value included in a plurality of fluctuation levels obtained by the fluctuation calculation unit 116 repeatedly calculating the fluctuation level when the transport device 2 is in an unloaded state. For example, the abnormality detection unit 119 may detect an abnormality of the transport device 2 when the number of fluctuation levels above the threshold value is above a predetermined threshold number of times.

The abnormality notification unit 121 outputs the detection of the abnormality by the abnormality detection unit 119, as visual information, auditory information, or the like. For example, the abnormality notification unit 121 causes a display device 101 (described below) to display the detection of the abnormality by the abnormality detection unit 119.

Figure 3:
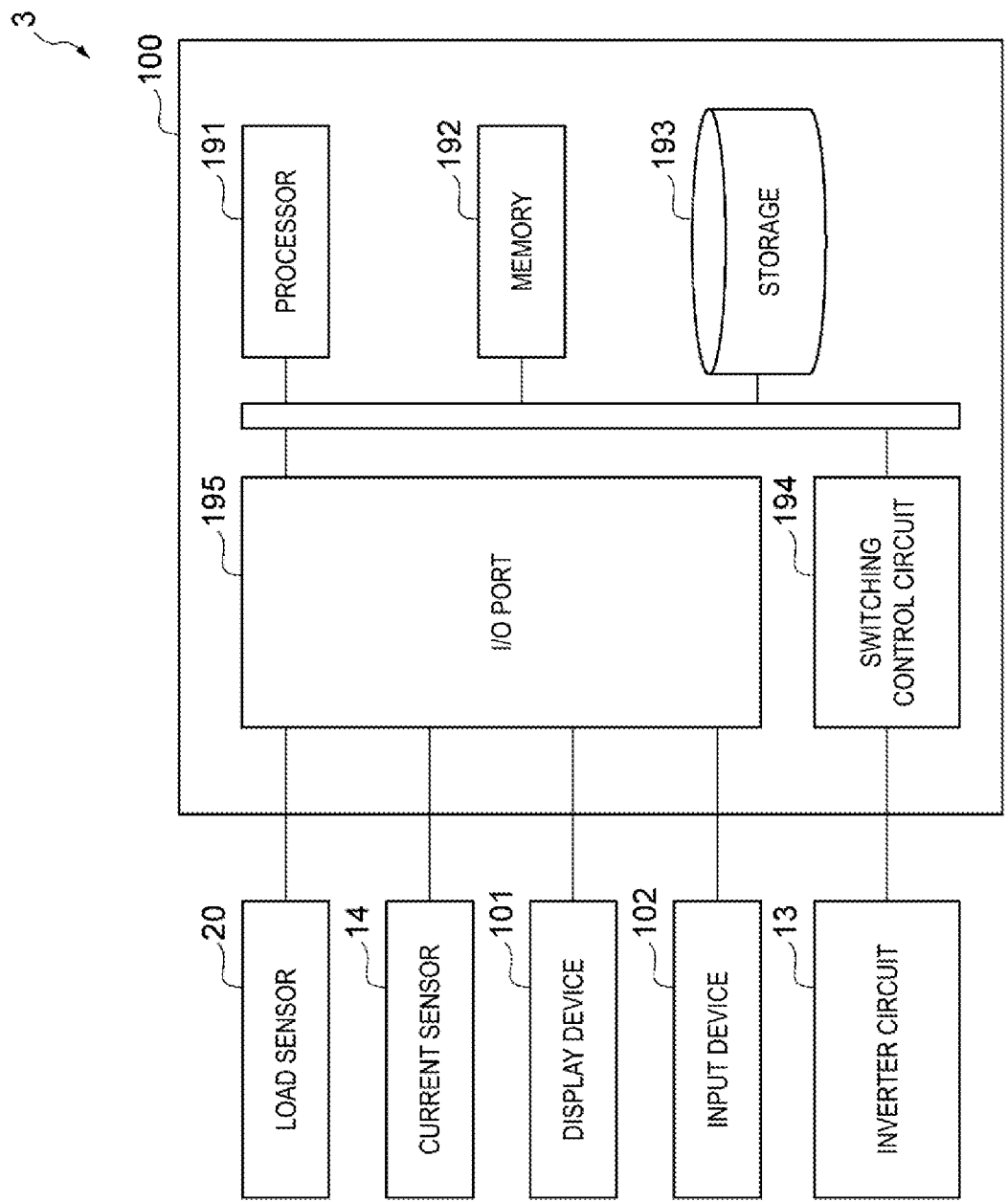
FIG. 3 is a block diagram illustrating an example of a hardware configuration of the power conversion device.

FIG. 3 is a block diagram illustrating an example of a hardware configuration of the power conversion device 3. As illustrated in FIG. 3, the power conversion device 3 includes the control circuit 100, the display device 101, and the input device 102. The control circuit 100 includes one or more processors 191, a memory 192, a storage 193, a switching control circuit 194, and an I/O port 195. The storage 193 includes a computer-readable storage medium such as a non-volatile semiconductor memory. The storage 193 stores a program for causing the power conversion device to execute causing, by the power conversion circuit 10 configured to convert the primary power to the secondary power and supply the secondary power to the motor 6, the secondary power quantity to follow the control command, calculating the fluctuation level representing a fluctuation range of the driving force of the motor within the sampling period having the predetermined length, and detecting, based on the fluctuation level, an abnormality of the transport device 2 including the motor and the transport unit 5 driven by the motor.

The memory 192 temporarily stores programs loaded from the storage medium of the storage 193 and calculation results from the processor 191. The processor 191 implements each functional block of the control circuit 100 by executing the program described above in cooperation with the memory 192. The switching control circuit 194 switches on or off the plurality of switching elements 15 in the inverter circuit 13 in accordance with commands from the processor 191 to output the above-described driving power to the motor 6. The I/O port 195 inputs and outputs electric signals between the inverter circuit 13, the current sensor 14, the display device 101, and the input device 102, in accordance with commands from the processor 191.

The display device 101 includes, for example, a liquid crystal monitor, and is used for information display to a user. The input device 102 is, for example, a keypad, and acquires input information by a user. The display device 101 and the input device 102 may be integrated like a so-called touch panel. The display device 101 and the input device 102 may be incorporated into the power conversion device 3, or may be provided on external equipment connected to the power conversion device 3.

Power Conversion Procedure

Next, as an example of the power conversion method, an example of a control procedure executed by the control circuit 100 will be described. The procedure includes causing, by the power conversion circuit 10 configured to convert the primary power to the secondary power and supply the secondary power to the motor 6, the secondary power quantity to follow the control command, calculating the fluctuation level representing a fluctuation range of the driving force of the motor δ within the sampling period having the predetermined length, and detecting, based on the fluctuation level, an abnormality of the transport device 2 including the motor δ and the transport unit 5 driven by the motor 6. For example, the procedure includes a control procedure of the power conversion circuit 10, a threshold value setting procedure, and an abnormality detection procedure.

The control circuit 100 executes the control procedure of the power conversion circuit 10 and the threshold value setting procedure in parallel, and then executes the control procedure of the power conversion circuit 10 and the abnormality detection procedure in parallel. For example, if the power conversion circuit 10 has been activated and the threshold value has not been set, the control circuit 100 executes the threshold value setting procedure. The control circuit 100 may perform the threshold value setting procedure in response to a user input (e.g., an input to the input device 102) directing threshold value setting. The control circuit 100 may constantly execute the abnormality detection procedure after setting the threshold value, or may execute the abnormality detection procedure in response to a user input (for example, an input to the input device 102) directing abnormality check. Hereinafter, examples of the control procedure of the power conversion circuit 10, the threshold value setting procedure, and the abnormality detection procedure will be described in detail.

Control Procedure of Power Conversion Circuit

Figure 4:
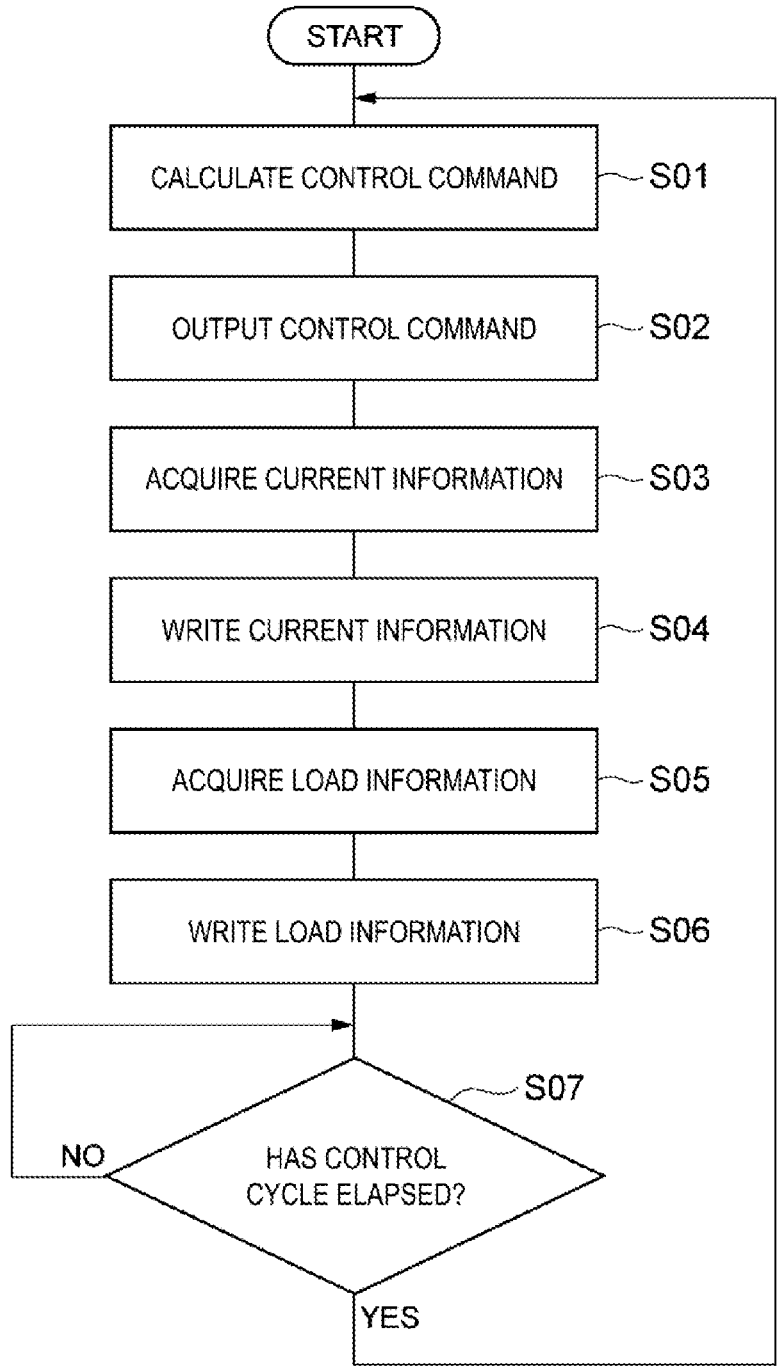
FIG. 4 is a flowchart illustrating an example of a control procedure of a power conversion circuit.

As illustrated in FIG. 4, the control circuit 100 sequentially executes steps S01, S02, S03, S04, S05, S06, and S07. In step S01, the command calculation unit 111 calculates the control command. For example, the command calculation unit 111 calculates the above-described voltage command, based on the frequency command. For example, the command calculation unit 111 calculates the above-described voltage command value and the above-described voltage phase angle based on the frequency command. In step S02, the command calculation unit 111 outputs the control command to the PWM control unit 112. In response, the PWM control unit 112 controls the power conversion circuit 10 such that the secondary power quantity follows the control command.

In step S03, the current acquisition unit 113 acquires current information from the current sensor 14, and calculates a δ-axis current and a γ-axis current, based on the current information and the voltage phase angle. In step S04, the current acquisition unit 113 writes the δ-axis current and the γ-axis current to the current information storage unit 114.

In step S05, the load information acquisition unit 115 acquires the above-described load information. In step S06, the load information acquisition unit 115 writes the load information to the current information storage unit 114 such that the load information is associated with the δ-axis current and the γ-axis current written by the current acquisition unit 113 in step S04. In step S07, the command calculation unit 111 waits until the above-described control cycle has elapsed. The control circuit 100 repeats the procedure described above.

Threshold Value Setting Procedure

Figure 5:
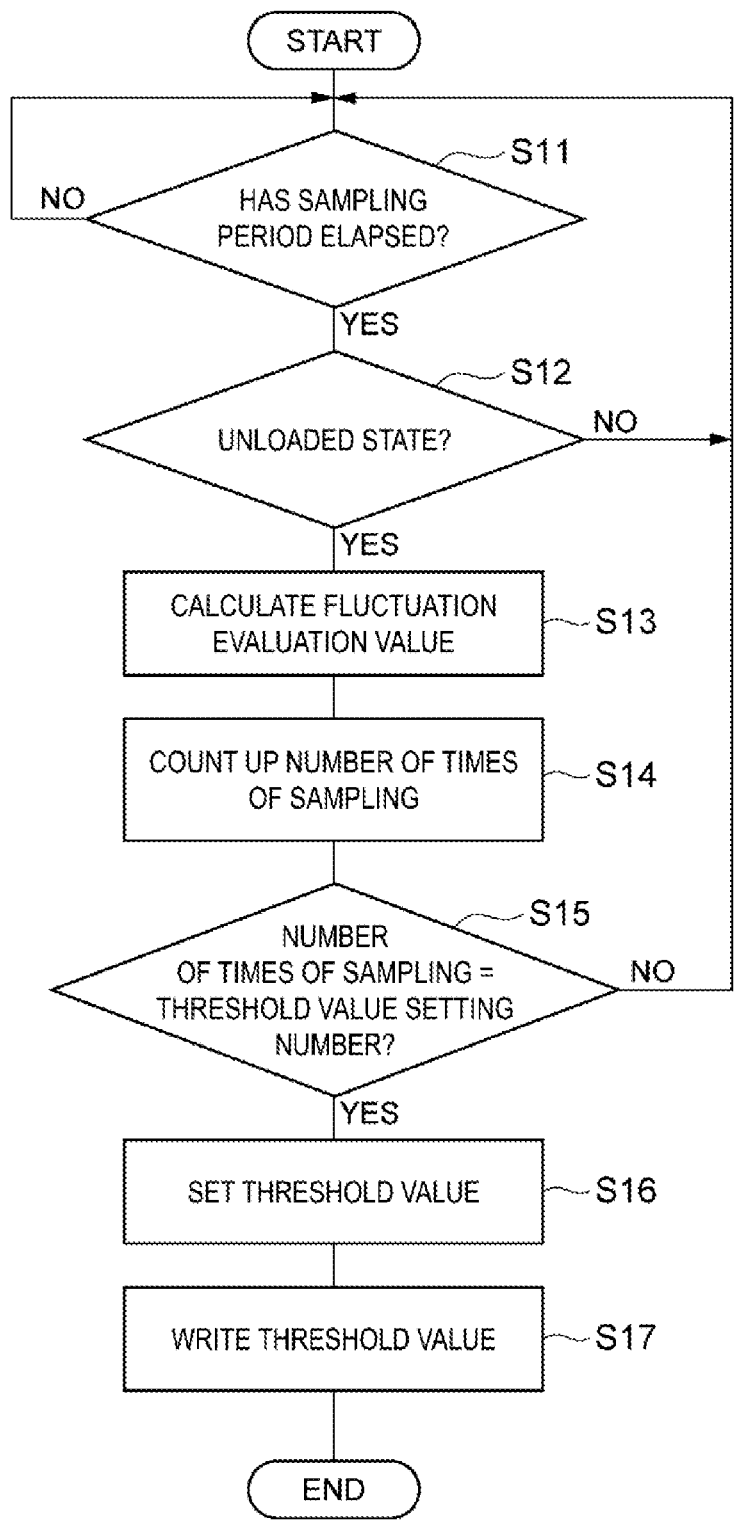
FIG. 5 is a flowchart illustrating an example of a threshold value setting procedure.

As illustrated in FIG. 5, the control circuit 100 first executes steps S11 and S12. In step S11, the fluctuation calculation unit 116 waits until the above-described sampling period has elapsed. In step S12, the fluctuation calculation unit 116 checks, based on the load information accumulated in the current information storage unit 114, whether the transport device 2 was in an unloaded state in the sampling period. In a case in which it is determined in step S12 that the transport device 2 was not in an unloaded state, the control circuit 100 returns the process to step S11.

In a case in which it is determined in step S12 that the transport device 2 was in an unloaded state, the control circuit 100 executes steps S13, S14, and S15. In step S13, the fluctuation calculation unit 116 calculates the above-described fluctuation level. For example, the fluctuation calculation unit 116 calculates a fluctuation level representing a fluctuation range of the δ-axis current within the sampling period. In step S14, the threshold value setting unit 117 counts up the number of times of sampling. In step S15, the threshold value setting unit 117 checks whether the number of times of sampling has reached the number of times set in advance (hereinafter, referred to as a "threshold value setting number").

In a case in which it is determined in step S15 that the number of times of sampling has not reached the threshold value setting number, the control circuit 100 returns the process to step S11. Thereafter, the calculation of the fluctuation level when the transport device 2 is in an unloaded state is repeated until the number of times of sampling reaches the threshold value setting number.

In a case in which it is determined in step S15 that the number of times of sampling has reached the threshold value setting number, the control circuit 100 executes steps S16 and S17. In step S16, the threshold value setting unit 117 sets a threshold value, based on a plurality of fluctuation levels obtained by repeating the calculation of the fluctuation level. For example, the threshold value setting unit 117 calculates the threshold value, based on the average value and the standard deviation of the plurality of fluctuation levels. For example, the threshold value setting unit 117 calculates the threshold value by adding, to the average value, a value obtained by multiplying the standard deviation by a predetermined multiplying factor. In step S17, the threshold value setting unit 117 writes the threshold value to the threshold value storage unit 118. Thus, the threshold value setting procedure is completed.

Abnormality Detection Procedure

Figure 6:
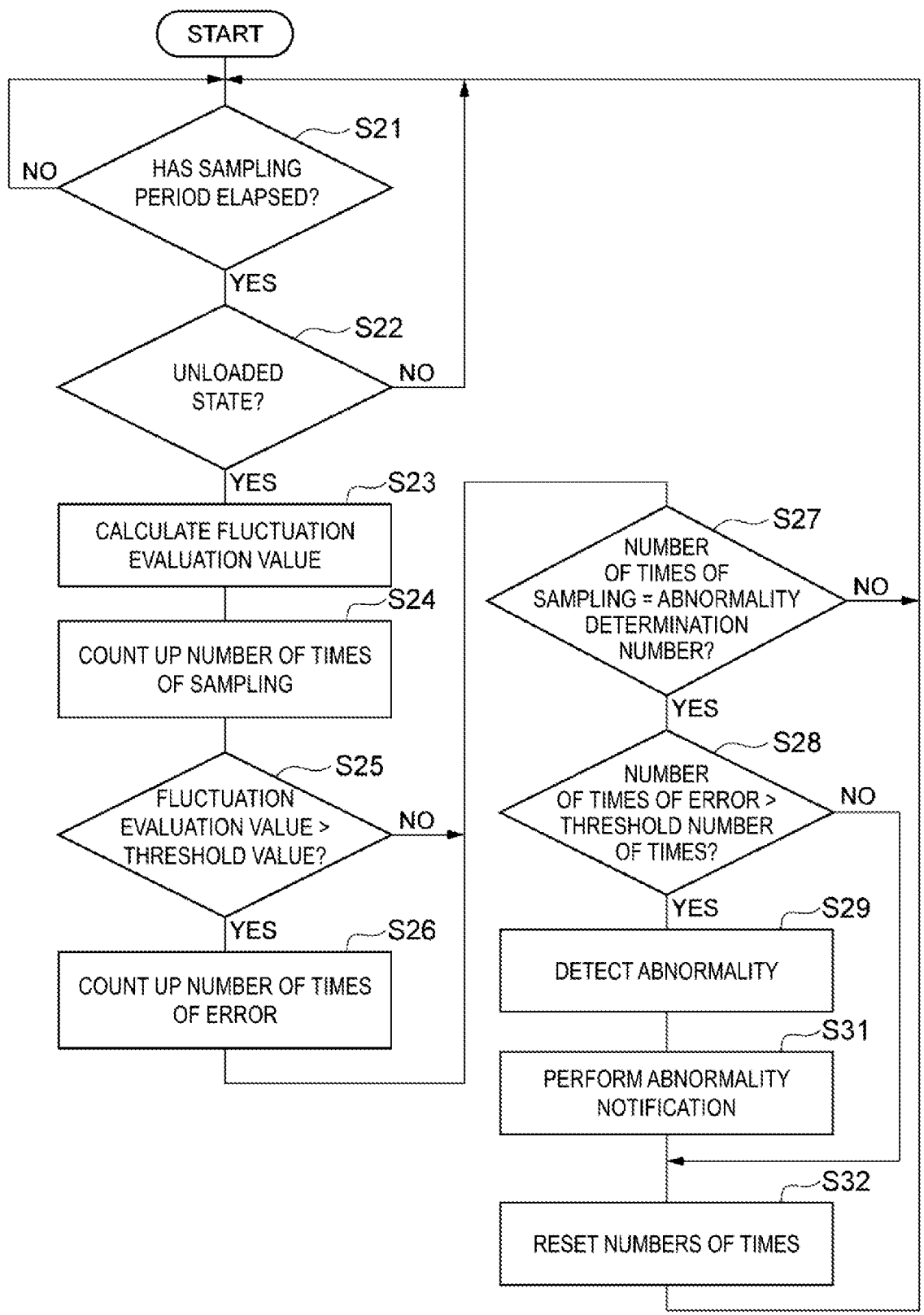
FIG. 6 is a flowchart illustrating an example of an abnormality detection procedure.

As illustrated in FIG. 6, the control circuit 100 first executes steps S21 and S22. In step S21, the fluctuation calculation unit 116 waits until the above-described sampling period has elapsed. In step S22, the fluctuation calculation unit 116 checks, based on the load information accumulated in the current information storage unit 114, whether the transport device 2 was in an unloaded state in the sampling period. In a case in which it is determined in step S22 that the transport device 2 was not in an unloaded state, the control circuit 100 returns the process to step S21.

In a case in which it is determined in step S22 that the transport device 2 was in an unloaded state, the control circuit 100 executes steps S23, S24, and S25. In step S23, the fluctuation calculation unit 116 calculates the above-described fluctuation level. For example, the fluctuation calculation unit 116 calculates a fluctuation level representing a fluctuation range of the δ-axis current within the sampling period. In step S24, the abnormality detection unit 119 counts up the number of times of sampling. In step S25, the abnormality detection unit 119 checks whether the fluctuation level, which was calculated by the fluctuation calculation unit 116 in step S23, is above the threshold value of the threshold value storage unit 118.

In a case in which it is determined in step S25 that the fluctuation level is above the threshold value, the control circuit 100 executes step S26. In step S26, the abnormality detection unit 119 counts up the number of times of error.

Next, the control circuit 100 executes step S27. In a case in which it is determined that in step S25 the fluctuation level is not above the threshold value, the control circuit 100 executes step S27 without executing step S26. In step S27, the abnormality detection unit 119 checks whether the number of times of sampling has reached the number of times set in advance (hereinafter, referred to as an "abnormality determination number").

In a case in which it is determined in step S27 that the number of times of sampling has not reached the abnormality determination number, the control circuit 100 returns the process to step S21. Thereafter, checking whether the fluctuation level is above the threshold value is repeated until the number of times of sampling reaches the abnormality determination number.

In a case in which it is determined in step S27 that the number of times of sampling has reached the abnormality determination number, the control circuit 100 executes step S28. In step S28, the abnormality detection unit 119 checks whether the number of times of error is above the number of times set in advance (the threshold number of times described above).

In a case in which it is determined in step S28 that the number of times of error is above the threshold number of times, the control circuit 100 executes steps S29 and S31. In step S29, the abnormality detection unit 119 detects an abnormality. In step S31, the abnormality notification unit 121 causes the display device 101 to display the detection of the abnormality by the abnormality detection unit 119.

Next, the control circuit 100 executes step S32. In a case in which it is determined in step S28 that the number of times of error is not above the threshold number of times, the control circuit 100 executes step S32 without executing steps S29 and S31. In step S32, the abnormality detection unit 119 resets the number of times of sampling and the number of times of error to zero. The control circuit 100 repeats the procedure described above. Note that, although, in the procedure described above, an example in which the number of times of error is checked each time the abnormality determination number has been reached is described, the abnormality detection unit 119 may simply detect an abnormality, based on whether the total number of times of error is above the threshold number of times. In this case, steps S27 and S32 are not required.

Modified Examples

The configuration in which an abnormality is detected based on the threshold value set in an unloaded state and the fluctuation level calculated in an unloaded state is described above as an example. However, setting of the threshold value and detection of an abnormality may be performed in a state which is not in an unloaded state. For example, the control circuit 100 may acquire a set of a load level and a fluctuation level and detect an abnormality of the transport device 2, based on a threshold value corresponding to the load level and the fluctuation level.

The threshold value setting unit 117 acquires a plurality of level sets each including a load level and a fluctuation level and sets, based on the plurality of level sets, a threshold value profile representing a relationship between the load level and a threshold value. For example, the threshold value setting unit 117 sets, for each of a plurality of load levels different from each other, a threshold value, based on a fluctuation level, to set, as the threshold value profile, a plurality of threshold value data sets each including a load level and a threshold value. The threshold value setting unit 117 may set, based on the plurality of threshold value data sets, a function representing a relationship between the load level and the threshold value, as the threshold value profile. The threshold value storage unit 118 holds the threshold value profile set by the threshold value setting unit 117.

The threshold value setting unit 117 sets, based on a load level and the threshold value profile, a threshold value corresponding to the load level. When the threshold value profile is a plurality of threshold value data sets, the threshold value setting unit 117 may calculate the threshold value corresponding to the above-described load level by interpolation of the plurality of threshold value data sets. When the threshold value profile is a function, the threshold value setting unit 117 may input a load evaluation value into the function to calculate a threshold value corresponding to the load evaluation value.

After the threshold value setting unit 117 sets the threshold value profile, the abnormality detection unit 119 acquires one level set including a load level and a fluctuation level and detects an abnormality of the transport device 2, based on the one level set (hereinafter, this level set will be referred to as a "check target") and the threshold value profile. For example, the abnormality detection unit 119 causes the threshold value setting unit 117 to set a threshold value corresponding to the load level of the check target. Hereinafter, this threshold value will be referred to as a temporary threshold value. The threshold value setting unit 117 sets, based on the threshold value profile, a temporary threshold value corresponding to the load level of the check target. If the fluctuation level of the check target is above the temporary threshold value, the abnormality detection unit 119 detects an abnormality of the transport device 2. For example, the control circuit 100 may constantly execute the abnormality detection procedure after setting the temporary threshold value, or may execute the abnormality detection procedure in response to a user input (for example, an input to the input device 102) directing abnormality check.

The abnormality detection unit 119 may repeat acquiring one level set according to a predetermined repetition condition to acquire a plurality of check target sets, and may detect an abnormality of the transport device 2, based on the number of check target sets above the threshold value profile included in the plurality of check targets. Hereinafter, examples of the threshold value setting procedure and the abnormality detection procedure in the present modified example will be described.

Threshold Value Setting Procedure

Figure 7:
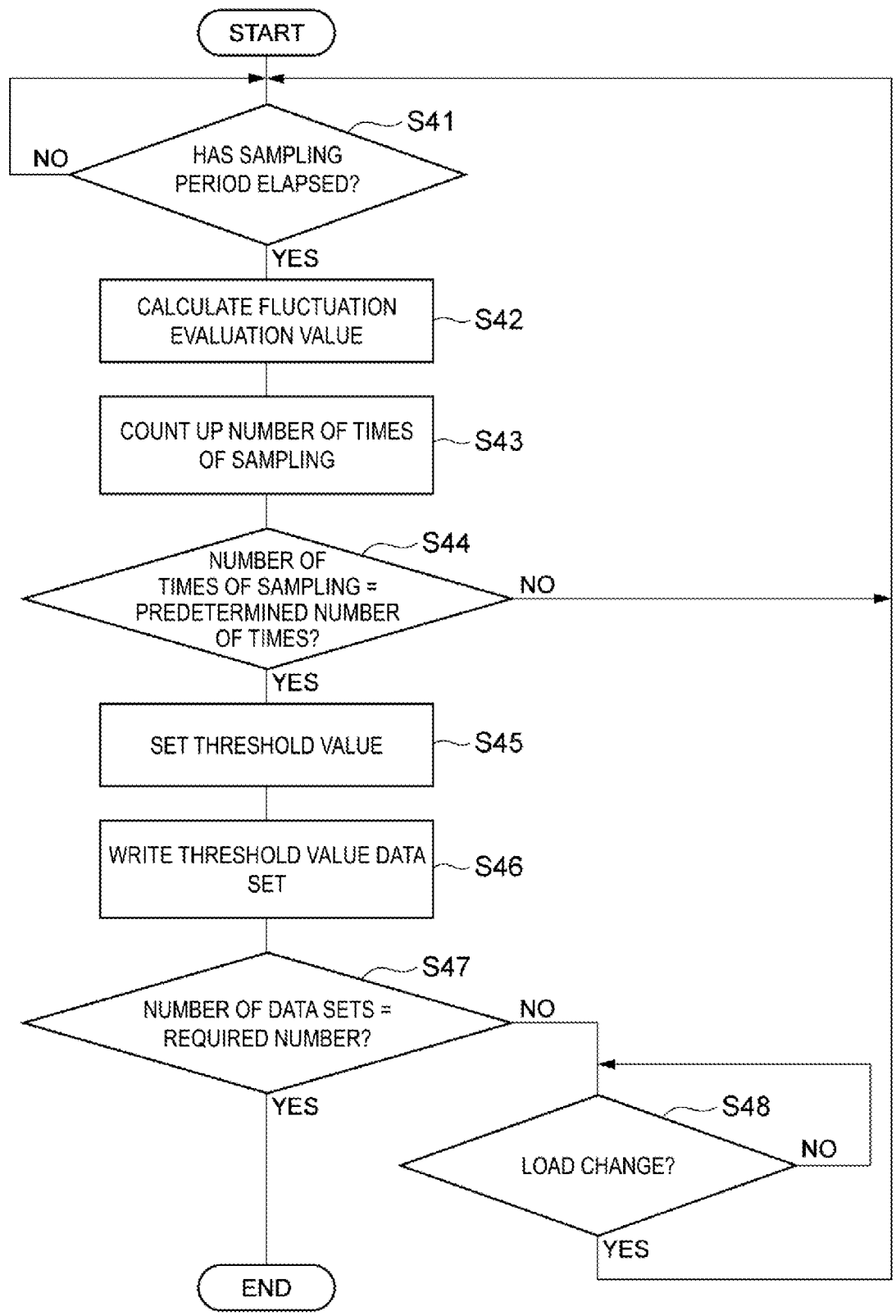
FIG. 7 is a flowchart illustrating a modified example of the threshold value setting procedure.

As illustrated in FIG. 7, the control circuit 100 first executes steps S41, S42, S43, and S44. In step S41, the fluctuation calculation unit 116 waits until the above-described sampling period has elapsed. In step S42, the fluctuation calculation unit 116 calculates the above-described fluctuation level. In step S43, the threshold value setting unit 117 counts up the number of times of sampling. In step S44, the threshold value setting unit 117 checks whether the number of times of sampling has reached the above-described threshold value setting number.

In a case in which it is determined in step S44 that the number of times of sampling has not reached the threshold value setting number, the control circuit 100 returns the process to step S41. Thereafter, the calculation of the fluctuation level is repeated until the number of times of sampling reaches the threshold value setting number.

In a case in which it is determined in step S44 that the number of times of sampling has reached the threshold value setting number, the control circuit 100 executes steps S45, S46, and S47. In step S45, similarly to step S16, the threshold value setting unit 117 sets a threshold value, based on the plurality of fluctuation levels. In step S46, the threshold value setting unit 117 writes, to the threshold value storage unit 118, a threshold value data set including a load level in the above-described sampling period and the threshold value calculated in step S45 associated with each other. In step S47, the threshold value setting unit 117 checks whether the number of threshold value data sets accumulated in the threshold value storage unit 118 has reached a required number for a threshold value profile.

In a case in which it is determined in step S47 that the number of threshold value data sets has not reached the required number, the control circuit 100 executes step S48. In step S48, the threshold value setting unit 117 waits for the load level to change. For example, the threshold value setting unit 117 waits for the current load level to change to a value different from the load level of the threshold value data set written in step S46. Then, the control circuit 100 returns the process to step S41. Thereafter, calculating the threshold value and writing the threshold value data set are repeated for different load levels until the number of threshold value data sets reaches the required number.

If it is determined in step S47 that the number of threshold value data sets has reached the required number, the plurality of threshold value data sets are set as the threshold value profile. The threshold value setting unit 117 may set, based on the plurality of threshold value data sets, a function representing a relationship between the load level and the threshold value, as the threshold value profile. Thus, the threshold value setting procedure is completed.

Abnormality Detection Procedure

Figure 8:
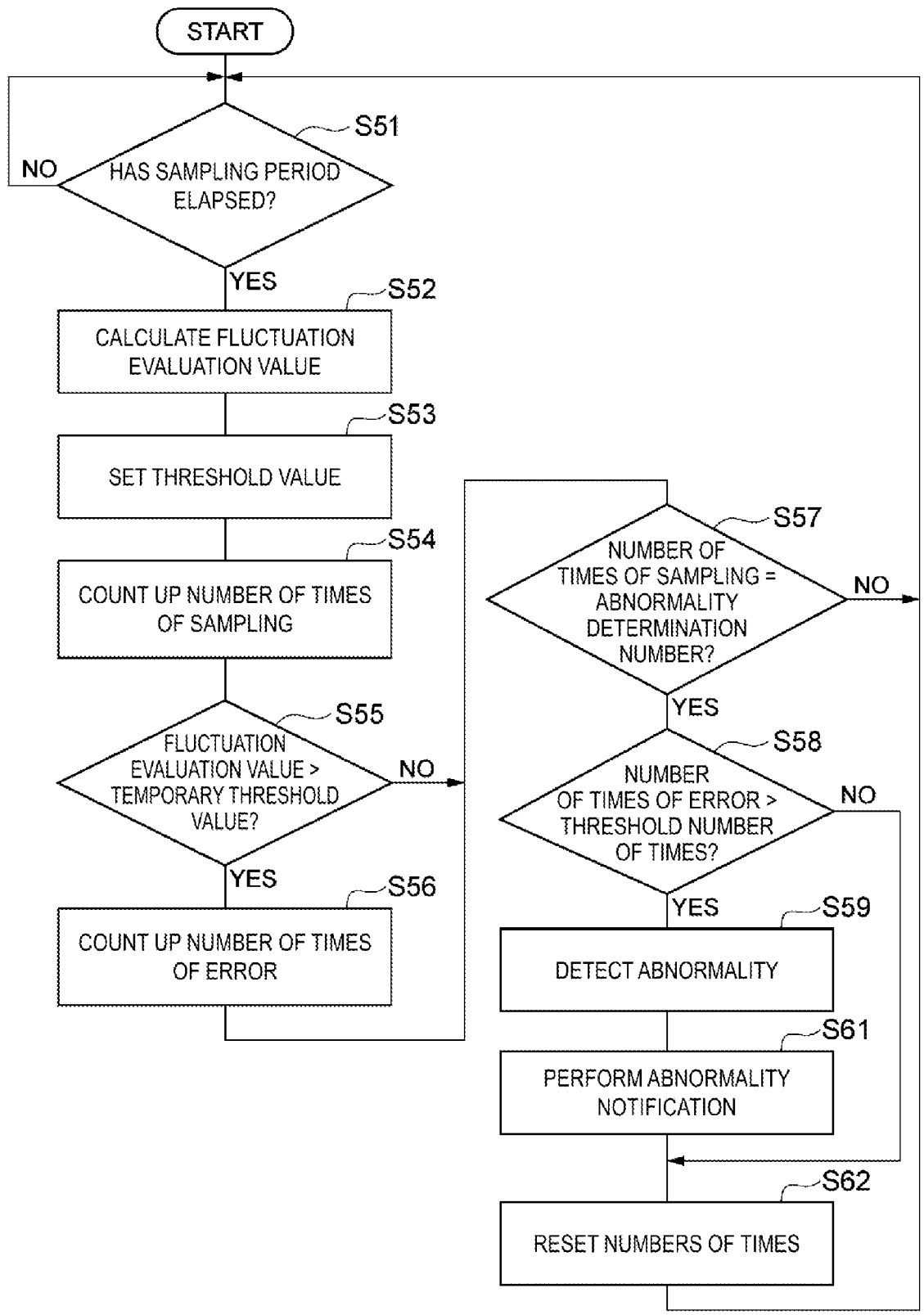
FIG. 8 is a flowchart illustrating a modified example of the abnormality detection procedure; and,
FIG. 9 is a block diagram illustrating a modified example of a diagnosis device.

As illustrated in FIG. 8, the control circuit 100 first executes steps S51, S52, S53, S54, and S55. In step S51, the fluctuation calculation unit 116 waits until the above-described sampling period has elapsed. In step S52, the fluctuation calculation unit 116 calculates the above-described fluctuation level. In step S53, the abnormality detection unit 119 causes the threshold value setting unit 117 to set a threshold value corresponding to a load level (the temporary threshold value described above). The threshold value setting unit 117 sets, based on the threshold value profile of the threshold value storage unit 118, the temporary threshold value corresponding to the load level.

In step S54, the abnormality detection unit 119 counts up the number of times of sampling. In step S55, the abnormality detection unit 119 checks whether the fluctuation level calculated by the fluctuation calculation unit 116 in step S52 is above the temporary threshold value set by the threshold value setting unit 117 in step S53.

In a case in which it is determined in step S55 that the fluctuation level is above the temporary threshold value, the control circuit 100 executes step S56. In step S56, the abnormality detection unit 119 counts up the number of times of error.

Next, the control circuit 100 executes step S57. In a case in which it is determined in step S55 that the fluctuation level is not above the temporary threshold value, the control circuit 100 executes step S57 without executing step S56. In step S57, the abnormality detection unit 119 checks whether the number of times of sampling has reached the above-described abnormality determination number.

In a case in which it is determined in step S57 that the number of times of sampling has not reached the abnormality determination number, the control circuit 100 returns the process to step S51. Thereafter, checking whether the fluctuation level is above the temporary threshold value is repeated until the number of times of sampling reaches the abnormality determination number.

In a case in which it is determined in step S57 that the number of times of sampling has reached the abnormality determination number, the control circuit 100 executes step S58. In step S58, the abnormality detection unit 119 checks whether the number of times of error is above the above-described threshold number of times.

In a case in which it is determined in step S58 that the number of times of error is above the threshold number of times, the control circuit 100 executes steps S59 and S61. In step S59, the abnormality detection unit 119 detects an abnormality. In step S61, the abnormality notification unit 121 causes the display device 101 to display the detection of the abnormality by the abnormality detection unit 119.

Next, the control circuit 100 executes step S62. In a case in which it is determined in step S58 that the number of times of error is not above the threshold number of times, the control circuit 100 executes step S62 without executing steps S59 and S61. In step S62, the abnormality detection unit 119 resets the number of times of sampling and the number of times of error to zero. The control circuit 100 repeats the procedure described above. Note that, although, in the procedure described above, an example in which the number of times of error is checked each time the abnormality determination number has been reached is described, the abnormality detection unit 119 may simply detect an abnormality, based on whether the total number of times of error is above the threshold number of times. In this case, steps S57 and S62 are not required.

Effects of Present Embodiment

As described above, the power conversion device 3 includes the power conversion circuit 10 configured to convert the primary power to the secondary power and supply the secondary power to the motor 6, and the control circuit 100 configured to cause, by the power conversion circuit 10, the secondary power quantity to follow the control command. The control circuit 100 calculates the fluctuation level representing a fluctuation range of the driving force of the motor δ within the sampling period having the predetermined length, and detects, based on the fluctuation level, an abnormality of the transport device 2 including the motor δ and the transport unit 5 driven by the motor 6.

The power conversion device 3 can reliably detect an abnormality of the transport device 2 based on information regarding the driving force that can be acquired by the power conversion device 3. Therefore, the power conversion device 3 is effective in simplifying a configuration for detecting an abnormality of the transport device 2.

The control circuit 100 may set a threshold value based on the fluctuation level when the transport device 2 is in an unloaded state, and after setting the threshold value, the control circuit 100 may calculate the fluctuation level when the transport device 2 is in an unloaded state and detect, based on the fluctuation level and the threshold value, an abnormality of the transport device 2. In this case, similar references can be used for the fluctuation range measurement for setting the threshold value and the fluctuation range measurement for detecting an abnormality, and thus an abnormality of the transport device 2 can be detected more reliably.

The control circuit 100 may detect an abnormality of the transport device 2, based on the number of fluctuation levels above the threshold value included in a plurality of fluctuation levels obtained by repeatedly calculating the fluctuation level when the transport device 2 is in an unloaded state. In this case, an abnormality of the transport device 2 can be detected more reliably.

The control circuit 100 may acquire a plurality of level sets each including the fluctuation level and a load level representing a magnitude of a load on the transport device 2 and set, based on the plurality of level sets, a threshold value profile representing a relationship between the load level and a threshold value, and after setting the threshold value profile, the control circuit 100 may acquire one level set including the load level and the fluctuation level and detect, based on the one level set and the threshold value profile, an abnormality of the transport device 2. In this case, the threshold value is changed according to the weight of a transport load, and thus an abnormality of the transport device 2 can be detected more reliably.

The control circuit 100 may detect an abnormality of the transport device 2, based on the number of level sets above the threshold value profile included in a plurality of evaluation results obtained by repeatedly acquiring one evaluation result set. In this case, an abnormality of the transport device 2 can be detected more reliably.

The control circuit 100 may calculate, as the control command and by the V/f method, the voltage command corresponding to the frequency command, and may calculate the fluctuation level, based on the frequency command and current flowing between the power conversion circuit 10 and the motor 6. In this case, even while the transport device 2 is driven by using a V/f control, an abnormality of the transport device 2 can be detected reliably.

Figure 9:
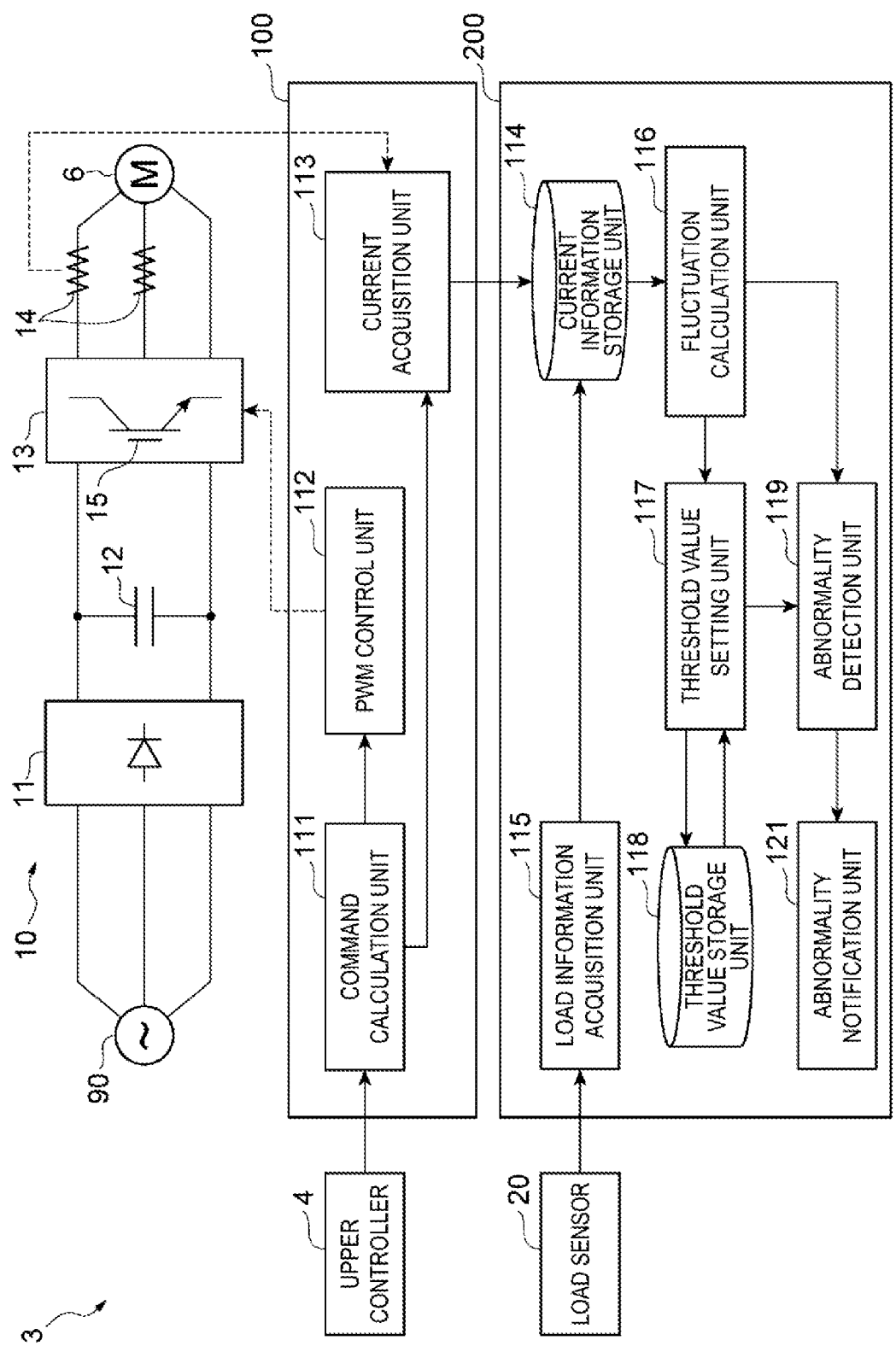

Embodiments have been described above. However, the present disclosure is not limited to the embodiments described above and various modifications are possible without departing from the gist of the present disclosure. Although, in the embodiments described above, a diagnosis device that calculates, based on the power supplied from the power conversion circuit 10 to the motor 6, the fluctuation level representing a fluctuation range of the driving force of the motor δ in the sampling period having the predetermined length and that detects, based on the fluctuation level, an abnormality of the transport device 2 is incorporated into the control circuit 100 of the power conversion device 3, no such limitation is intended. As illustrated in FIG. 9, a diagnosis device 200 separate from the power conversion device 3 may be provided. The diagnosis device 200 may be incorporated into the upper controller 4.

The equipment to be subjected to the abnormality detection is not limited to the transport device 2. The diagnosis device can be used for detecting an abnormality of any equipment including a motor and a movable unit driven by the motor. The motor is not limited to a rotary electric motor. For example, the motor may be a linear motor.

REFERENCE SIGNS LIST

1 Transport system
2 Transport device (equipment)
3 Power conversion device
5 Transport unit (movable unit)
6 Motor
10 Power conversion circuit
100 Control circuit
200 Diagnosis device

The invention claimed is:

1. A power conversion device, comprising:
a power conversion circuit configured to convert primary power to secondary power and supply the secondary power to a motor; and
a control circuit configured to cause, by the power conversion circuit, a secondary power quantity to follow a control command, wherein
the control circuit calculates a fluctuation level of driving force of the motor within a sampling period having a predetermined length and detects, based on the fluctuation level, an abnormality of equipment including the motor and a movable unit driven by the motor.

2. The power conversion device according to claim 1, wherein the control circuit sets a threshold value, based on the fluctuation level when the equipment is in an unloaded state, and
after the control circuit sets the threshold value, the control circuit calculates the fluctuation level when the equipment is in an unloaded state, and detects an abnormality of the equipment based on the fluctuation level and the threshold value.

3. The power conversion device according to claim 2, wherein the control circuit detects an abnormality of the equipment, based on the number of fluctuation levels above the threshold value included in a plurality of fluctuation levels obtained by repeatedly calculating the fluctuation level when the equipment is in an unloaded state.

4. The power conversion device according to claim 3, wherein the control circuit calculates, as the control command and by a V/f method, a voltage command vector corresponding to a frequency command, and calculates the fluctuation level, based on the frequency command and current flowing between the power conversion circuit and the motor.

5. A transport system, comprising:
the power conversion device according to claim 3; and
the equipment, wherein
the equipment includes,
as the movable unit, a transport unit configured to support and transport an object; and
as the motor, a motor configured to drive the transport unit.

6. The power conversion device according to claim 2, wherein the control circuit calculates, as the control command and by a V/f method, a voltage command vector corresponding to a frequency command, and calculates the fluctuation level, based on the frequency command and current flowing between the power conversion circuit and the motor.

7. A transport system, comprising:
the power conversion device according to claim 2; and
the equipment, wherein
the equipment includes,
as the movable unit, a transport unit configured to support and transport an object; and
as the motor, a motor configured to drive the transport unit.

8. The power conversion device according to claim 1, wherein the control circuit acquires a plurality of level sets each including the fluctuation level and a load level representing a magnitude of a load on the equipment and sets, based on the plurality of level sets, a threshold value profile representing a relationship between the load level and a threshold value, and
after the control circuit sets the threshold value profile, the control circuit acquires one level set including the load level and the fluctuation level and detects, based on the one level set and the threshold value profile, an abnormality of the equipment.

9. The power conversion device according to claim 8, wherein the control circuit detects an abnormality of the equipment, based on the number of level sets above the threshold value profile included in a plurality of level sets obtained by repeatedly acquiring the one level set.

10. The power conversion device according to claim 9, wherein the control circuit calculates, as the control command and by a V/f method, a voltage command vector corresponding to a frequency command, and calculates the fluctuation level, based on the frequency command and current flowing between the power conversion circuit and the motor.

11. A transport system, comprising:
the power conversion device according to claim 9; and
the equipment, wherein
the equipment includes,
as the movable unit, a transport unit configured to support and transport an object; and
as the motor, a motor configured to drive the transport unit.

12. The power conversion device according to claim 8, wherein the control circuit calculates, as the control command and by a V/f method, a voltage command vector corresponding to a frequency command, and calculates the fluctuation level, based on the frequency command and current flowing between the power conversion circuit and the motor.

13. A transport system, comprising:
the power conversion device according to claim 8; and
the equipment, wherein
the equipment includes,
as the movable unit, a transport unit configured to support and transport an object; and
as the motor, a motor configured to drive the transport unit.

14. The power conversion device according to claim 1, wherein the control circuit calculates, as the control command and by a V/f method, a voltage command vector corresponding to a frequency command, and calculates the fluctuation level, based on the frequency command and current flowing between the power conversion circuit and the motor.

15. A transport system, comprising:
the power conversion device according to claim 14; and
the equipment, wherein
the equipment includes,
as the movable unit, a transport unit configured to support and transport an object; and
as the motor, a motor configured to drive the transport unit.

16. A transport system, comprising:
the power conversion device according to claim 1; and
the equipment, wherein
the equipment includes,
as the movable unit, a transport unit configured to support and transport an object; and
as the motor, a motor configured to drive the transport unit.

17. A power conversion method, comprising:
causing, by a power conversion circuit configured to convert primary power to secondary power and supply the secondary power to a motor, a secondary power quantity to follow a control command;
calculating a fluctuation level of driving force of the motor within a sampling period having a predetermined length; and
detecting, based on the fluctuation level, an abnormality of equipment including the motor and a movable unit driven by the motor.

18. A non-transitory computer-readable storage medium with a program stored thereon for causing a power conversion device to execute:
causing, by a power conversion circuit configured to convert primary power to secondary power and supply the secondary power to a motor, a secondary power quantity to follow a control command;
calculating a fluctuation level representing a fluctuation range of driving force of the motor within a sampling period having a predetermined length; and
detecting, based on the fluctuation level, an abnormality of equipment including the motor and a movable unit driven by the motor.

\* \* \* \* \*